United States Patent
Duvanenko et al.

[19]

[11] Patent Number: 5,951,625
[45] Date of Patent: Sep. 14, 1999

[54] INTERPOLATED LOOKUP TABLE CIRCUIT

[75] Inventors: Victor J. Duvanenko; Eric Shumard, both of Indianapolis, Ind.

[73] Assignee: Truevision, Inc., Santa Clara, Calif.

[21] Appl. No.: 08/885,249

[22] Filed: Jun. 30, 1997

[51] Int. Cl.$^6$ .................................................. G06F 7/38
[52] U.S. Cl. ............................................................. 708/290
[58] Field of Search ............................ 364/723, 745.02; 708/290

[56] References Cited

U.S. PATENT DOCUMENTS

| | | | |
|---|---|---|---|
| 4,837,722 | 6/1989 | Sara | 364/723 |
| 5,684,981 | 11/1997 | Jones | 364/723 |

*Primary Examiner*—Tan V. Mai
*Attorney, Agent, or Firm*—Frishauf, Holtz, Goodman, Langer & Chick, P.C.

[57] ABSTRACT

An interpolated lookup table circuit includes an input port for receiving an input signal having a first plurality of bits (N bits) including a first portion (Q bits) and a second portion (N−Q bits), a lookup table (LUT) having a plurality of entries wherein each of the plurality of entries has a second plurality of bits including a third portion (V bits) and a fourth portion (D bits), selection means operatively coupled to the input port and responsive to at least the first portion of the input signal which selects one of the plurality of LUT entries based on the first portion of the lookup table input signal. The interpolated LUT circuit also includes a combiner operatively coupled to the input port and the LUT wherein the combiner combines the second portion of the input signal, the fourth portion of the selected LUT entry, and the third portion of the second plurality of bits of the selected LUT entry to provide an interpolated LUT output signal which is input to a rounding circuit wherein the interpolated LUT output signal is rounded or truncated to provide a rounded interpolated LUT output signal.

38 Claims, 5 Drawing Sheets

INTERPOLATED LOOKUP TABLE CIRCUIT

BACKGROUND OF THE INVENTION

1. Field of the Invention

The present invention relates to an apparatus and method of signal processing, and more specifically to a lookup table (LUT) circuit capable of approximating a variety of functions by receiving an N-bit digital input signal and providing an M-bit digital output signal by utilizing interpolation to significantly increase the precision of the output signal provided by the LUT without requiring an increase in the number of LUT entries.

2. Description of the Related Art

LUTs, implemented in either hardware or software, are used in many computer related fields such as computer graphics, image processing and analog or digital video processing, to convert one function into another function. A LUT is an example of a trade-off between memory usage and the amount of computation. One of the more common applications of LUTs is in computer graphics and image processing. In order to provide an image of an object on a display device (e.g., such as a cathode ray tube (CRT) of a display terminal), an image of an object is typically recorded by a camera (video or the like) by transforming a representation of the object into an electronic signal in analog or digital form. Then, when desired, the electronic signal is provided to the display terminal for display of the image.

Typically, display devices such as CRTs process electronic signals and output (i.e., display) light corresponding to representations of these signals (e.g. luminance) in a non-linear manner. U.S. Pat. No. 5,196,924 (the entire disclosure of which is incorporated herein by reference) provides a useful explanation of this phenomenon at Cols. 1–3. For this reason, in order to display the image of the object as it is intended to be viewed (i.e., to compensate for the non-linear behavior of the CRT), either the camera or the circuitry associated with the display terminal must modify (i.e., apply a transfer function to) the electronic signal before light corresponding to the electronic signal is output by the CRT. This signal compensation (i.e., application of a transfer function) is commonly called "gamma correction", as explained in U.S. Pat. No. 5,196,924.

Figure 1:
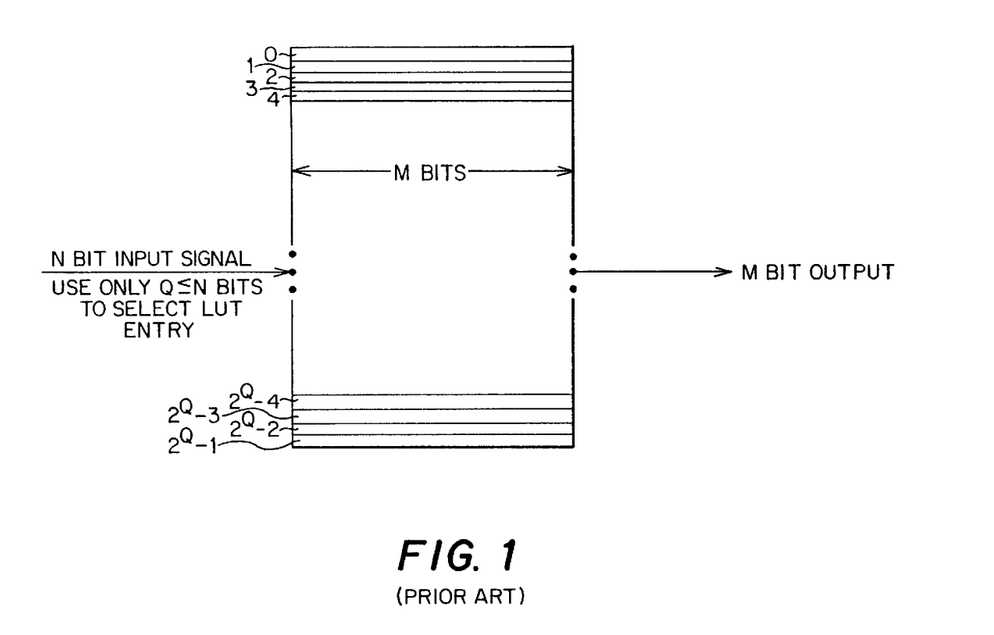
FIG. 1 is a representation of a conventional LUT having an N bit input signal wherein only Q bits (wherein Q≦N) are used to select an appropriate M-bit LUT.

A typical computer graphics display includes at least three LUTs each having $2^Q$ entries, wherein each LUT entry contains M-bits (see FIG. 1). For example, a typical LUT maps a Q (e.g., a 6 or more) bit input signal to an M (e.g., a 6 or more) bit output signal, allowing for an arbitrary input to output mapping function that is fully precomputed and stored in memory (i.e., LUT). The use of a LUT stored in a memory of some type, typically an electronic memory chip, is a common technique for implementing gamma correction. One example of a LUT embodied in a chip is Part No. Bt473 available from Brooktree Corporation, of San Diego, Calif. A more detailed discussion of the interaction of display terminals, "gamma correction" and LUTs is provided in *Computer Graphics* by Foley & Van Dam (1990), at pages 166–170, 564–567 and 860–861, which pages are incorporated herein by reference.

LUTs have the inherent characteristic that the number of LUT entries increases exponentially as the number of bits of the input signal that are utilized to select the LUT entry increases. In general, a LUT of $2^Q$ entries will be required for a Q-bit input signal. For example, an 8-bit input signal requires a LUT with $2^8=256$ entries, while a 12-bit input signal requires $2^{12}=4096$ entries. As the number of bits in the input signal becomes larger, at some point, depending on the current level of technology, the LUT memory size becomes prohibitively large and expensive, while the processing speed decreases.

Referring now to FIG. 1, in order to maintain processing speed and reduce the number of LUT entries (e.g., to $<2^N$ entries where N is the number of bits of the input signal), it is generally accepted to use less than the total number of bits (e.g., Q bits) of the N-bit input signal to select the appropriate LUT entry. This conventional use of only a portion of the input signal to determine the appropriate LUT entry is shown in FIG. 1. More specifically, FIG. 1 shows mapping of Q bits of an N-bit input signal ($Q \leq N$) to an M-bit LUT output signal.

A drawback to limiting the number of input signal bits that are utilized to select the LUT entry is that a substantial amount of information (e.g., the N minus Q unused bits of the N-bit input signal) relating to the object image is not employed in determining the proper LUT entry and, correspondingly, the output signal/image. Thus, the signal output by the LUT includes a certain amount of error (for example, rounding or truncation error) due to inaccuracies introduced by the non-use of information present in the input signal. This leads to a loss of precision of the signal output by the LUT, which may be significant in certain applications. Since the storage, transfer and manipulation of graphic and video images typically involves the application of LUTs at several stages of processing, the introduction of even a relatively minor amount of error by each LUT can accumulate until the total error introduced becomes significant and objectionable.

One known technique for reducing the number of LUT entries relies on interpolation. As disclosed, for example, in U.S. Pat. No. 5,568,596, one portion of the input signal (i.e., the four most significant bits of an eight bit input signal) is used to identify two LUT entries. Then, another portion of the input signal (i.e., the four least significant bits) are used to calculate an interpolation value between the two selected LUT entries. Since in such a prior art technique more than one LUT entry is required for interpolation, a dual-port (i.e., dual input) LUT (RAM) is used that receives two LUT entry selection signals, one from each of two independent LUT entry selectors. A drawback to utilizing a dual-port RAM is that this device typically costs more than a single-port RAM. In addition, dual-port RAMs require more chip area than single-port RAMs (in some technologies, dual-port RAMs require twice the chip area as single-port RAMs). Moreover, dual-port RAMs typically operate at a slower speed than single-port RAMs.

OBJECTS AND SUMMARY OF THE INVENTION

It is, therefore, an object of the present invention to provide an apparatus and method to provide a higher degree of precision of LUT outputs without increasing the number of LUT entries.

It is yet another object of the present invention to provide an apparatus and method to interpolate between LUT entries to provide a higher degree of precision of a LUT output.

It is still another object of the present invention to provide a method and apparatus which utilizes a greater number of bits of an input signal without increasing the number of LUT entries.

It is yet another object of the present invention to provide a more precise LUT output signal based on an input signal by increasing the number of bits of each LUT entry.

It is a further object of the present invention to utilize a greater number of bits of an input signal than previously utilized to provide a more precise LUT output while requiring only a relatively small increase in LUT memory size.

It is still a further object of the present invention to provide a more economical method and apparatus for interpolation between two LUT entries which employs a single port RAM as the LUT.

It is yet a further object of the present invention to overcome inherent disadvantages of known LUTs.

In accordance with one form of the invention, an interpolated LUT circuit includes an input port for receiving an input signal having a first plurality of bits (N bits) including a first portion (e.g., most significant bits, i.e., MSB) and a second portion (e.g., least significant bits, i.e. LSB), and a LUT having a plurality of entries wherein each of the plurality of entries includes a second plurality of bits having a third portion (e.g., "Value", i.e., V bits) and a fourth portion (e.g., "Delta", i.e., D bits). The interpolated LUT circuit also includes a selector circuit operatively coupled to said input port and which is responsive to at least the first portion of the input signal for selecting one of the plurality of LUT entries. The interpolated LUT circuit also includes a multiplier operatively coupled to said input port and said LUT. The multiplier combines the second portion of the input signal and the second portion of the second plurality of bits of the selected LUT entry to provide a multiplier output signal (i.e., an adjustment signal). The interpolated LUT circuit further includes an adder operatively coupled to the LUT and to the multiplier output port. The adder combines the multiplier output signal and the first portion of the second plurality of bits of the selected LUT entry to provide an interpolated circuit LUT output signal.

In accordance with another form of the invention, an interpolated LUT circuit includes an input port for receiving an input signal having a first plurality of bits including a first portion (e.g., MSB) and a second portion (e.g., LSB), and a LUT having a plurality of entries wherein each of the plurality of entries includes a second plurality of bits having a first portion (e.g., "Value", i.e., V bits) and a second portion (e.g., "Delta", i.e., D bits). The interpolated LUT circuit also includes a selector circuit operatively coupled to the interpolated LUT circuit input port. The selector circuit is responsive to at least the first portion of the input signal for selecting one of the plurality of LUT entries. The interpolated LUT circuit further includes a combiner circuit operatively coupled to the input port and the LUT for combining the second portion of the input signal, the second portion of the second plurality of bits of the selected LUT entry, and the first portion of the second plurality of bits of the selected LUT entry to provide an interpolated LUT output signal.

In accordance with another form of the invention, an interpolated LUT circuit includes an input port for receiving an input signal having a first plurality of bits including a first portion (e.g., MSB) and a second portion (e.g., LSB), and a LUT having a plurality of entries wherein each of the plurality of entries includes a first portion ("Value", i.e., V bits) and a second portion ("Delta", i.e., D bits). The LUT is responsive to at least the first portion of the input signal for selecting one of the plurality of LUT entries. The interpolated LUT circuit also includes a combiner circuit for combining the second portion of the input signal, the second portion of the second plurality of bits of the selected LUT entry and the first portion of the second plurality of bits of the selected LUT entry to provide an interpolated LUT output signal.

In accordance with another form of the present invention, an interpolated lookup table (LUT) circuit includes an input port for receiving an input signal, a single-port LUT having a plurality of entries, wherein the single-port LUT is responsive to at least a portion of the input signal for selecting one of the plurality of entries of the single-port LUT and, a combiner circuit for combining at least a portion of the input signal and at least one signal output by the single-port LUT to provide an interpolated LUT output signal.

In accordance with another form of the present invention, a method for determining an interpolated value of a LUT having a plurality of entries, in response to an input signal having a first plurality of bits including a first portion (e.g., MSB) and a second portion (e.g., LSB) wherein each of the plurality of LUT entries has a second plurality of bits including a first portion (e.g., "Value") and a second portion (e.g., "Delta"), includes selecting one of the plurality of LUT entries in response to the first portion of the input signal, and combining at least a portion of the input signal and the selected LUT entry to provide the interpolated value of the LUT.

In accordance with another form of the present invention, an interpolated LUT circuit includes an input port for receiving an input signal having a first plurality of bits including at least a first portion and a second portion, and first and second single-port LUTs each having a plurality of entries, wherein each of the plurality of entries of said first and second LUTs having a second plurality of bits. Each of the first and second LUTs being responsive to at least the first portion of the input signal for selecting at least first and second entries of the LUT. The interpolated LUT circuit further includes an interpolator circuit operatively coupled to the first and second LUTs for performing an interpolation function utilizing at least the entries selected from each of the first and second LUTs to produce an interpolated LUT output signal.

In accordance with another form of the present invention, a method for determining an interpolated value of first and second LUTs having a plurality of entries in response to an input signal having a first plurality of bits including a first portion (e.g., MSB) and a second portion (e.g., LSB) wherein each of the plurality of LUT entries has a second plurality of bits includes selecting at least a first entry of the first LUT and a second entry of the second LUT in response to the first portion of the input signal, and interpolating between the selected first and second entries to provide the interpolated value of the LUT.

In accordance with another form of the present invention, a method for determining an interpolated value utilizing first and second LUTs having a plurality of entries in response to an N-bit input signal having a first plurality of bits including a first portion and a second portion wherein each of the plurality of LUT entries has a second plurality of bits includes replicating the input signal to provide first and second copies of the input signal, utilizing the first copy of the input signal to select an entry of the first LUT, utilizing the second copy of the input signal to select an entry of the second LUT, providing the selected entry of the first LUT to an interpolator, providing the selected entry of the second LUT to an interpolator, and interpolating between the selected entry of the first LUT and the selected entry of the second LUT to provide an interpolated value.

A preferred form of the apparatus and method which provides an interpolated LUT output signal, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENT

Figure 2:
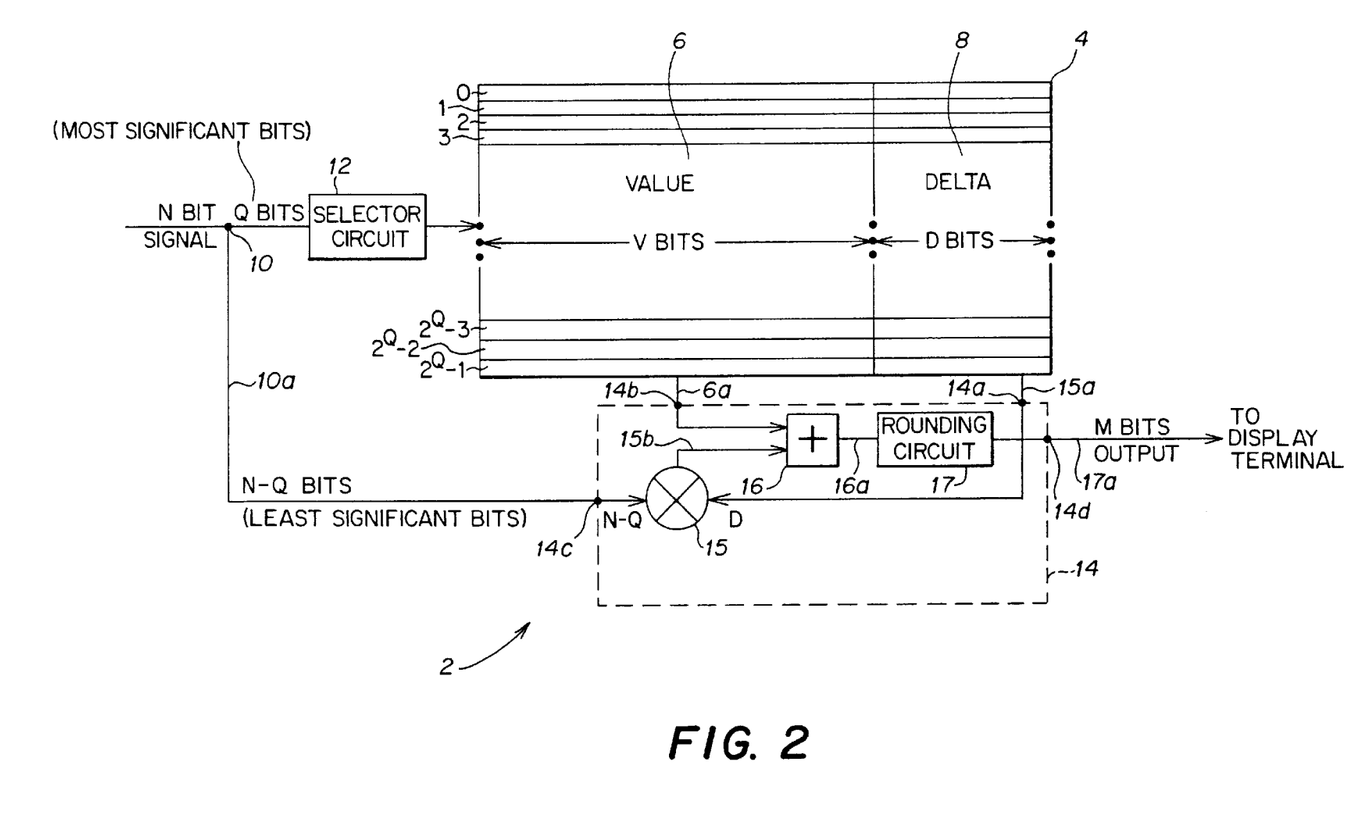
FIG. 2 is a block diagram of one embodiment of the interpolated LUT circuit of the present invention.

Referring now to FIG. 2 of the drawings, one embodiment of an interpolated lookup table (LUT) circuit 2 for providing an interpolated LUT output signal (e.g., an M-bit output signal) based on an input signal (e.g., an N-bit input signal) is shown. While the present invention is described in the context of a graphics or video display environment, it is foreseen that the interpolated LUT circuit can replace any conventional LUT in any system, for example mathematics, print, audio, digital data synthesizer systems and the like, where an increase in the precision of a LUT output signal is desired without increasing the number of LUT entries. It is also foreseen that the interpolated LUT circuit can enable a reduction in the number of LUT entries while substantially maintaining the precision of the LUT output.

In a preferred embodiment of the invention, the interpolated LUT circuit 2 includes a single-port LUT (RAM) 4 having $2^Q$ entries (labelled 0, 1, 2, 3 ... $2^Q-3$, $2^Q-2$, $2^Q-1$ in FIG. 2). The interpolated LUT circuit 2 receives an N (e.g. 12) bit input signal. The LUT preferably receives up to a 12 bit input signal in, for example, 8.4 unsigned format. The whole part, which includes the Q most significant bits (e.g., the 8 bits of the 8.4 unsigned format), is used to select one of the $2^Q$ LUT entries. (The utilization of the fractional part is explained in detail below). Each LUT entry preferably includes a number of bits V, and a number of bits D. The LUT and, correspondingly, each entry stored therein, is preferably classified into at least first and second portions. The first portion 6, hereinafter called a "Value" portion, is preferably able to store the V (e.g., 11) bits. The second portion 8, hereinafter called a "Delta" portion, is preferably able to store the D (e.g., 5) bits. Both the Value and Delta portions of each LUT entry are preferably fixed-point numbers. In one embodiment using unsigned format, the Value portion is in 8.3 format (i.e., 8 whole bits and 3 fractional bits) and the Delta portion is in 2.3 format (i.e., 2 whole bits and 3 fractional bits). In substitution of one of the whole or fractional bits of the unsigned format as explained above, each Value and Delta portion may include a bit which is reserved to indicate the sign (either positive or negative) of the corresponding portion of the LUT entry. While the 8.3 and 2.3 fixed-point number formats have been identified above, it is foreseen that other fixed-point number formats may be employed. Examples are: (1) Value in 8.2 unsigned format, Delta in 4.2 unsigned format; (2) Value in 8.3 unsigned format, Delta in 2.3 signed format; and (3) Value in 8.2 unsigned format, Delta in 4.2 signed format.

Value and Delta portions are preferably computed as follows:

1. The Value bits of a particular LUT location q (i.e., an entry from 0 to $2^Q-1$) is computed in the "best way possible", for example, using double precision floating-point and the ITU-709 standard for gamma-correction for a CRT display device which defines a continuous gamma correction function $F_c(X)$ to be:

$F_c(X) = 4.5X$ when $0 \leq X < 0.018$ $F_c(X) = 1.099X^{0.45} - 0.099$ when $0.018 \leq X \leq 1$ where X varies from 0 to 1. In the preferred embodiment, the value of X varies in equal increments between 0 and 1 in accordance with the number of LUT entries (i.e., each increment is equivalent to 1÷Q where Q is the number of LUT entries). However, it is foreseen that X need not vary in equal increments between 0 and 1, and that the number of increments between 0 and 1 need not coincide with the number of LUT entries. The resulting Value portion of $F_c(X)$ for entry q is truncated to the desired precision of the Value field (e.g. 8.3 fixed-point).

2. The "best" Value of the q+1 location of the LUT is computed in the same manner as set forth in connection with the q location, and is kept temporarily at full precision, for example, double-precision floating-point (i.e., the Value portion of q+1 is not truncated).

3. Delta for the q location is computed by subtracting the truncated Value of q (see 1 above) from the "best" Value of q+1 (step 2 above), and then rounding the result to the desired precision of the Delta field (e.g. 2.3 fixed-point).

Referring again to FIG. 2, the interpolated LUT circuit 2 includes an input port 10 for receiving the N-bit input signal, and a selector circuit 12 operatively coupled to input port 10. The input signal preferably has a first plurality of bits including a first portion, Q-bits (referred to as the most significant bits, MSBs) and a second portion, N−Q bits (referred to as the least significant bits, LSBs). The selector circuit 12, which is preferably interposed between the input port 10 and the LUT 4, receives and is responsive to at least the first portion (i.e., MSBs) of the input signal. In the preferred embodiment, the selector circuit 12 receives the Q (e.g. 8) MSBs of the N-bit input signal. The selector circuit then selects the LUT entry (q) that most closely corresponds to the first portion (i.e. MSBs) of the input signal (e.g., LUT entry #2). As described above, the selected LUT entry (in this example, LUT entry #2) includes a Value portion (V bits) and a Delta portion (D bits).

In the preferred embodiment and as known in the art, the selector circuit 12 is a decoder which receives the MSB's of the input signal and selects one of the LUT entries. It is also foreseen, as known in the art, that the selector circuit (decoder) may be incorporated into the functions of the LUT.

The interpolated LUT circuit 2 also includes a combiner circuit 14. In the preferred embodiment, the combiner circuit 14 includes at least three input ports 14a, 14b, 14c and an output port 14d. A first input port 14a of the combiner circuit 14 receives on line 15a the Delta portion (i.e., D-bits) of the selected LUT entry (e.g., LUT entry #2) which was selected based upon the first portion (e.g., Q-bits) of the N-bit input signal. A second input port 14b of combiner circuit 14 receives on line 6a the Value portion (i.e., V-bits) of the selected LUT entry. A third input port 14c of combiner circuit 14 is operatively coupled to the input port 10 of the interpolated LUT circuit 2 for receiving on line 10a the second portion, (i.e., N−Q LSBs bits) of the input signal.

In the preferred embodiment, the combiner circuit 14 includes a multiplier 15 which combines (e.g., multiplies) the signals (i.e., values) provided thereto (i.e., the N−Q LSB bits provided on line 10a with the D-bits provided on line 15a), and provides on line 15b a multiplier output signal (i.e., an adjustment signal). The combiner circuit 14 further includes a summer 16 coupled to the output port of the multiplier 15 and the Value portion 6. As explained below, the summer 16 receives the multiplier output signal (i.e., adjustment signal) provided on line 15b and the Value portion (V bits) of the selected LUT entry (e.g., LUT entry #2) provided on line 6a. The summer 16 preferably adds the signals input thereto, and provides on line 16a a summer output signal which is provided to a rounding circuit 17 that is operatively coupled to the summer. The rounding circuit 17, as explained in detail below, rounds or truncates the summer output signal and provides an interpolated LUT output signal on line 17a. The interpolated LUT output signal, which preferably consists of M bits, is then provided to a display terminal (not shown) for display on a CRT.

The rounding operation performed by the rounding circuit 17 is explained as follows. Multiplying N—Q bits (provided on line 10a) with Delta of entry q (D bits provided on line 15a) in multiplier 15 and adding the product to the Value portion of entry q (V bits provided on line 6a), creates a result that has more bits (and is thus more accurate) than the number of output bits that is required (in one embodiment, 12-bits of output are required). Therefore, a method of discarding the extra bits of precision is needed, and a rounding operation utilizing rounding circuit 17 is one such method. A preferred method of rounding unsigned numbers is accomplished by adding 0.5 to the summer output signal followed by truncation (i.e., discarding the LSBs which are not desired). This method yields the closest correct result at the desired precision (i.e. number of output bits, for fixed-point numbers). There are many other well known rounding techniques which could be utilized. For brevity, each will not be explained here.

It is foreseen that, alternative to the above description, the summer 16 performs subtraction and the multiplier 15 performs division. The term "summer" is used in the sense of adding or subtracting and the term "multiplier" is used in the sense of multiplying or dividing. It is also foreseen that the combiner circuit 14 may include arithmetic operators not mentioned above such as dividers and subtractors by replacing or being used in conjunction with those arithmetic operators disclosed above.

The operation of the interpolated LUT circuit 2 shown in FIG. 2 will now be described. An N-bit input signal (e.g., a video signal) is provided to the input port 10 of the interpolated LUT circuit from, for example, a video camera (not shown). The N-bit input signal is typically a 10–16 bit digital signal, although input signals with more bits or fewer bits are foreseen. In the preferred embodiment, the LUT stores $2^Q-1$ LUT entries (where $Q \leq N$), wherein each LUT entry (q) has V+D bits. The first, whole portion of the input signal (e.g., the Q MSBs) is utilized by the selector circuit 12 to determine which of the $2^Q-1$ LUT entries is to be selected (i.e., most closely corresponds to the Q bits of the N bit input signal). Based upon the selected LUT entry (e.g., LUT entry #2), the Delta portion (e.g., the D LSBs) of the selected LUT entry is provided on line 15a to multiplier 15 of combiner circuit 14. Also, the second, fractional portion (e.g., N—Q LSBs) of the N-bit input signal is provided on line 10a to multiplier 15. The multiplier 15 combines the signals provided thereto and provides on line 15b a multiplier output signal (i.e., adjustment signal) representative of a deviation of the second portion of the input signal from the Value portion of the LUT. The multiplier output signal is then provided to a summer 16 which sums (e.g., adds or subtracts) the multiplier output signal with the Value portion (V bits) of the selected LUT entry provided on line 6a. The resulting signal is provided to rounding circuit 17, and rounded or truncated therein, and then provided on line 17a as the M-bit interpolated LUT circuit output signal for that specific input signal. The LUT output signal is representative of the Value portion of the LUT entry, plus or minus the adjustment signal determined by the LSBs of the input signal which, in accordance with the invention, are not discarded, but, rather, relied upon to increase the precision of the LUT's output.

As a result of the above-described invention, an M-bit output value is provided in a shorter time period than previously achievable due to the use of a single-port RAM. In addition, a more precise LUT output signal is provided from a $2^Q-1$ entry LUT based on an N-bit input signal where $Q \leq N$. This is due to the fact that more bits (e.g., all N bits instead of just Q bits) of the input signal are utilized to generate the LUT output signal. This is accomplished, as explained above, without increasing the number of LUT entries. Only the length (e.g., size/width) of each LUT entry is increased. The increased precision is accomplished without increasing the number of LUT entries by having the output signal partially precomputed in the LUT, and partially computed "on the fly". This reduces the storage requirement and removes LUT errors which are introduced with prior art LUT circuits. In addition, only a doubling of the size of the LUT memory is required (e.g. from 256 entries×8 bits=2048 memory units to a total of 256 entries×16 bits=4096 memory units; as compared to a total of 4096×12 bits=49,152 memory units as the size of a traditional LUT that utilizes all 12 bits of the input signal and requires 12 bits of output). Therefore, the size of the LUT is not exponentially increased due to the use of additional input bits and each operation of the LUT does not take a significantly longer period of time than prior art LUTs. In addition, since a more precise LUT output signal is provided, when a plurality of LUTs are connected in series for signal processing, less error is introduced and what would otherwise be a substantial loss of precision in the resulting signal is not encountered.

The Value and Delta portions of the LUT entries can be programmed to be selectively settable for various conditions. Specifically, it is possible to provide an additional input (not shown) to the interpolated LUT that would configure its operation for a specific condition. For example, this additional input could control the interpolated LUT circuit to interpret the Value portion as 8.3 unsigned format, or 8.2 unsigned format, or Delta as 2.3 unsigned format, or 2.3 signed format. The additional input is thus used to advise the interpolated LUT circuit as to how to interpret the LUT entries (in the above example, how to interpret the 16 bits of each LUT entry). This feature enables the present invention to approximate a wider variety of functions more accurately than a LUT with a single configuration would be capable of.

Figure 3A:
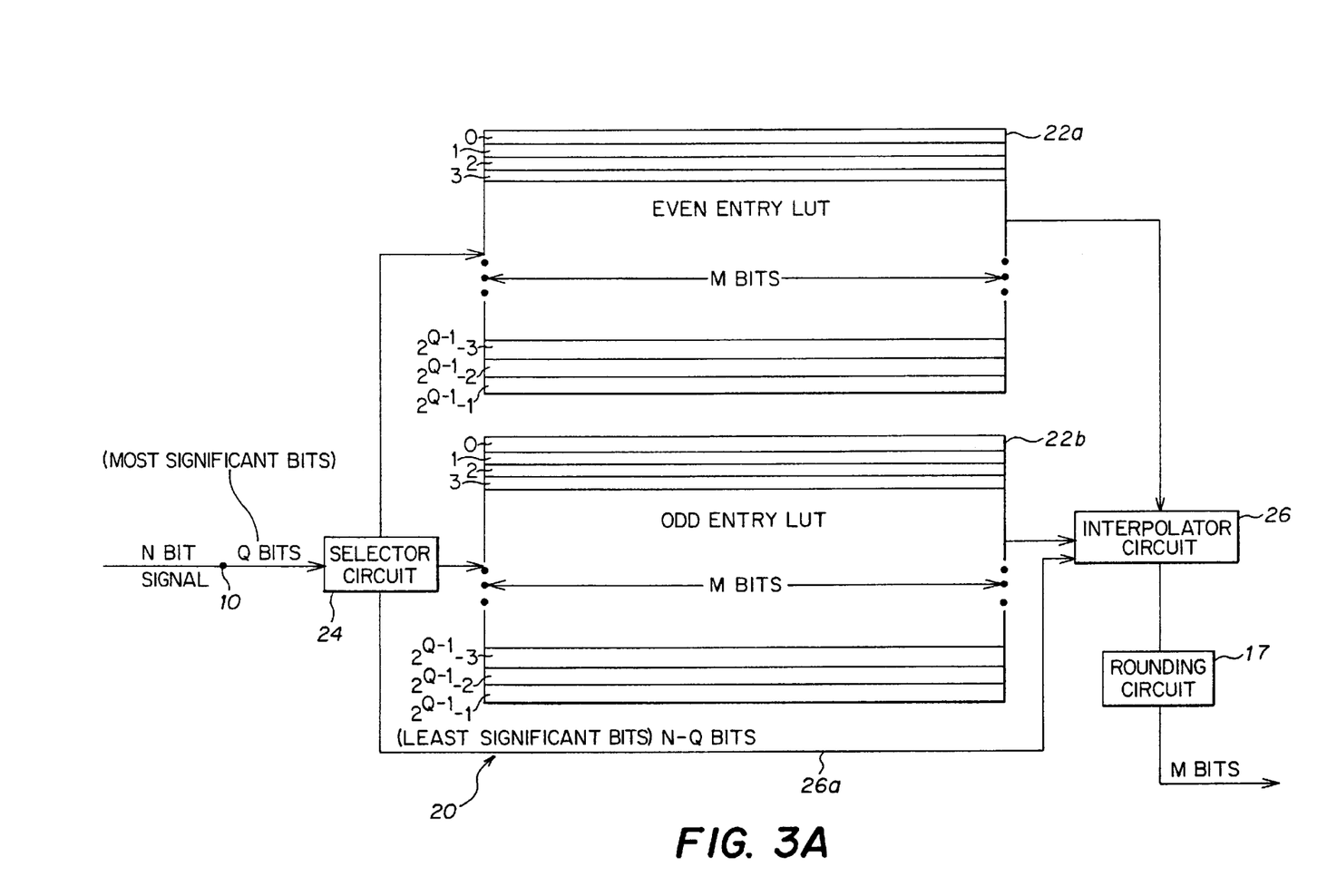
FIG. 3A is a block diagram of a second embodiment of the interpolated LUT circuit of the present invention.

Referring now to FIG. 3A of the drawings, a second embodiment of the present invention is shown. The interpolated LUT circuit 20 includes first (EVEN entry LUT) and second (ODD entry LUT) LUTs 22a, 22b each having $2^{(Q-1)}$ entries numbered from zero to $2^{(Q-1)}-1$. The combination of the first and second LUTs stores information similar to that stored in the dual-port LUT (i.e., RAM) of the prior art. The first and second LUTs are formed by substantially equally separating the information traditionally stored in one dual-port LUT into two single-port LUTs. The first and second LUTs 22a, 22b preferably respectively store alternating entries traditionally stored in the dual-port LUT. Specifically, the equivalent of the even (i.e., zeroth, second, fourth, etc.) entries of the dual-port LUT are stored in first LUT 22a (i.e., EVEN entry LUT), while the equivalent of the odd (i.e., first, third, fifth, etc.) entries of the dual-port LUT are stored in the second LUT 22b (i.e. ODD entry LUT). This arrangement is demonstrated in Table 1 below, wherein the original 256 elements are distributed and renumbered within each of the ODD and EVEN entry LUTs.

TABLE 1

| Dual-Port LUT | Even Entry LUT | Odd Entry LUT |
|---|---|---|
| 0 | 0 | |
| 1 | | 0 |
| 2 | 1 | |
| 3 | | 1 |
| 4 | 2 | |
| 5 | | 2 |
| 6 | 3 | |
| 7 | | 3 |
| ... | ... | ... |
| 254 | 127 | |
| 255 | | 127 |

Each of the ODD and EVEN entry LUTs are single-port devices (i.e., one read or input port). The even and odd entries are stored in the EVEN entry LUT and the ODD entry LUT so that consecutive entries traditionally stored in the dual-port LUT can be accessed in parallel.

The interpolated LUT circuit preferably receives an N-bit input signal at input port 10 wherein Q bits (preferably the MSB's but alternatively a combination of the MSB's and LSB's or only the LSB's) are provided to selector circuit 24 to select an entry from each of the EVEN entry LUT and ODD entry LUT that most closely approximates the value corresponding to the Q-bits of the input signal.

The interpolated LUT circuit 20 also includes an interpolator circuit 26 having at least three input ports for receiving the selected entry from the EVEN entry LUT, the selected entry from the ODD entry LUT, and the N–Q LSBs of the input signal via line 26a. The interpolator circuit 26 also preferably includes internal switching circuitry (not shown) coupled to the EVEN entry LUT input port and ODD entry LUT input port of the interpolator circuit for internally exchanging (i.e., switching) the selected entries from the EVEN and ODD entry LUTs (described below). The interpolator circuit performs an interpolation function utilizing the selected entries from the EVEN and ODD entry LUTs and the LSBs to perform linear interpolation to provide a more precise LUT output value based upon the corresponding input signal. Coupled to the output port of the interpolator circuit 26 is a rounding circuit 17 which rounds or truncates the interpolator circuit output signal, as described above in connection with FIG. 2.

The operation of the interpolator circuit 26 is explained as follows. Linear interpolation is one of the most simple and well known methods of determining a value between two given values. For example, given $X_S$ as a start value, and $X_E$ as an end value, any number of values ($Y_T$) between $X_S$ and $X_E$ can be generated by using parametric linear interpolation as follows:

$$Y_T = X_S*(1-T) + T*X_E \text{ where } 0 \leq T \leq 1$$

Table 2 illustrates the linear nature of this parametric equation by example, where the parameter T is varied in increments of 0.25 over the entire range,

TABLE 2

| T | $Y_T$ |
|---|---|
| 0 | $X_S$ |
| 0.25 | $0.75*X_S + 0.25*X_E$ |
| 0.50 | $0.50*X_S + 0.50*X_E$ |
| 0.75 | $0.25*X_S + 0.75*X_E$ |
| 1 | $X_E$ |

Thus, it may be possible to produce values between neighboring entries of a LUT by restating the above equation as, $$Y_T = X_N*(1-T) + T*X_{N+1} \text{ where } 0 \leq T \leq 1$$

where $X_N$ and $X_{N+1}$ are the N-th and the (N+1)-th entries in the LUT. This formulation, however, requires simultaneous access to two neighboring LUT entries (e.g., location N and N+1) as well as the value for parameter T, which, with a dual-port RAM is an unnecessarily expensive (both in terms of cost and size) proposition. This is because a dual-port RAM is designed to be simultaneously accessed at any two of its entries. However, when interpolation is carried out, only two adjacent entries are of interest at a given time. Thus, the capability of accessing any two entries simultaneously is unnecessary, and yet adds to the size, complexity and cost of the RAM.

Figure 3B:
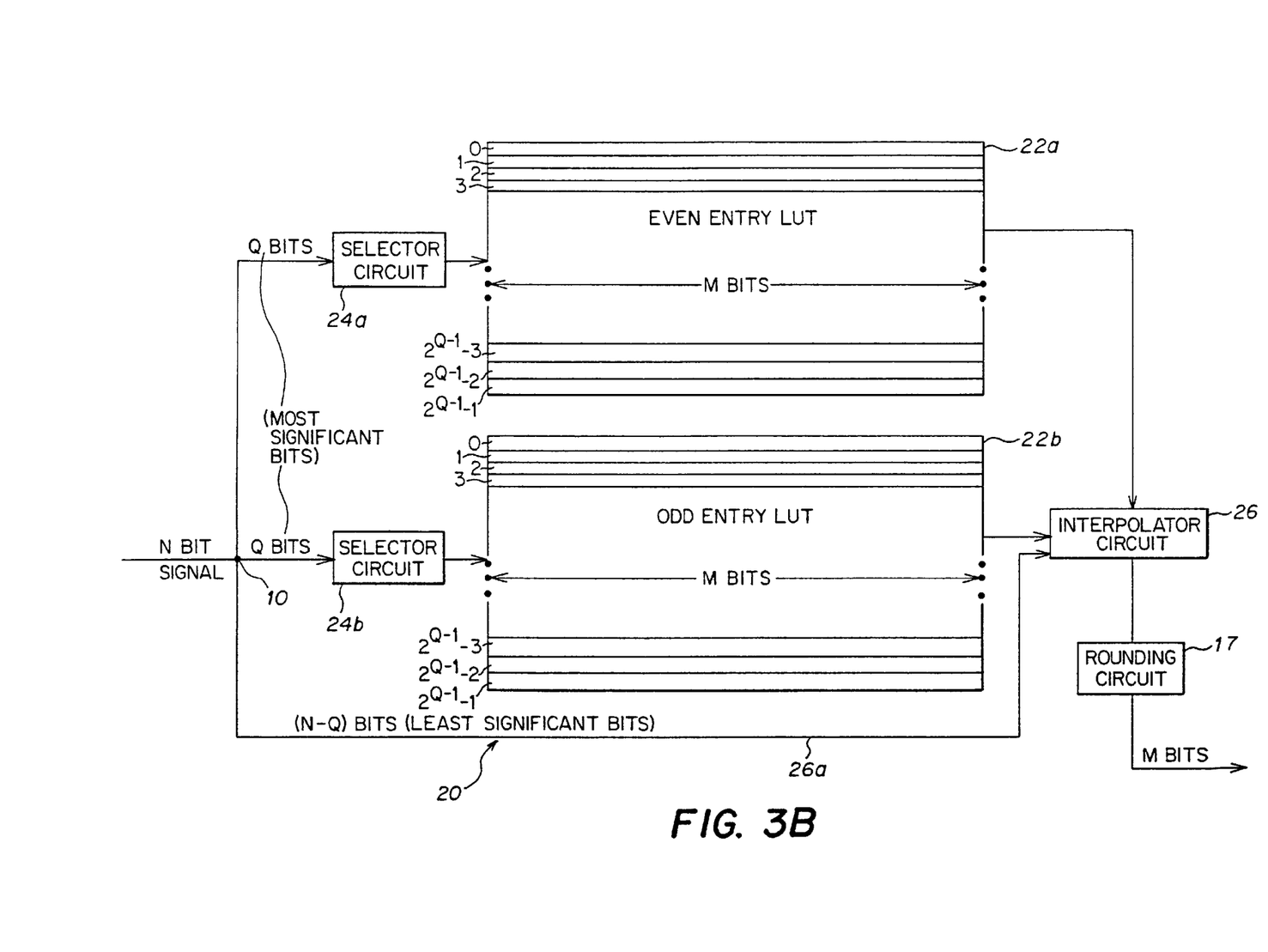
FIG. 3B is a block diagram of an alternative second embodiment of the interpolated LUT circuit of the present invention.

In the embodiments shown in FIGS. 3A and 3B, the four-bit LSBs correspond to parameter T above. The LSBs are indicative of a location between the two neighboring LUT entries. This is exactly what parameter T is as well (notice that parameter T is a fraction, since it varies between 0 and 1). This is demonstrated by Table 3 as follows:

TABLE 3

| T | $Y_T$ |
|---|---|
| $0.0000_B$ | $X_N$ |
| $0.0100_B$ | $0.75*X_N + 0.25*X_{N+1}$ |
| $0.1000_B$ | $0.50*X_N + 0.50*X_{N+1}$ |
| $0.1100_B$ | $0.25*X_N + 0.75*X_{N+1}$ |
| $1.0000_B$ | $X_{N+1}$ |

As a result of the present invention (i.e., since the memory array is separated into even and odd halves) access to the $X_N$ and $X_{N+1}$ LUT entries can be readily simultaneously obtained without resorting to a dual-port RAM array.

An explanation of other interpolation methods can be found in U.S. Pat. No. 5,148,381, the entire disclosure of which is incorporated herein by reference.

Figure 4:
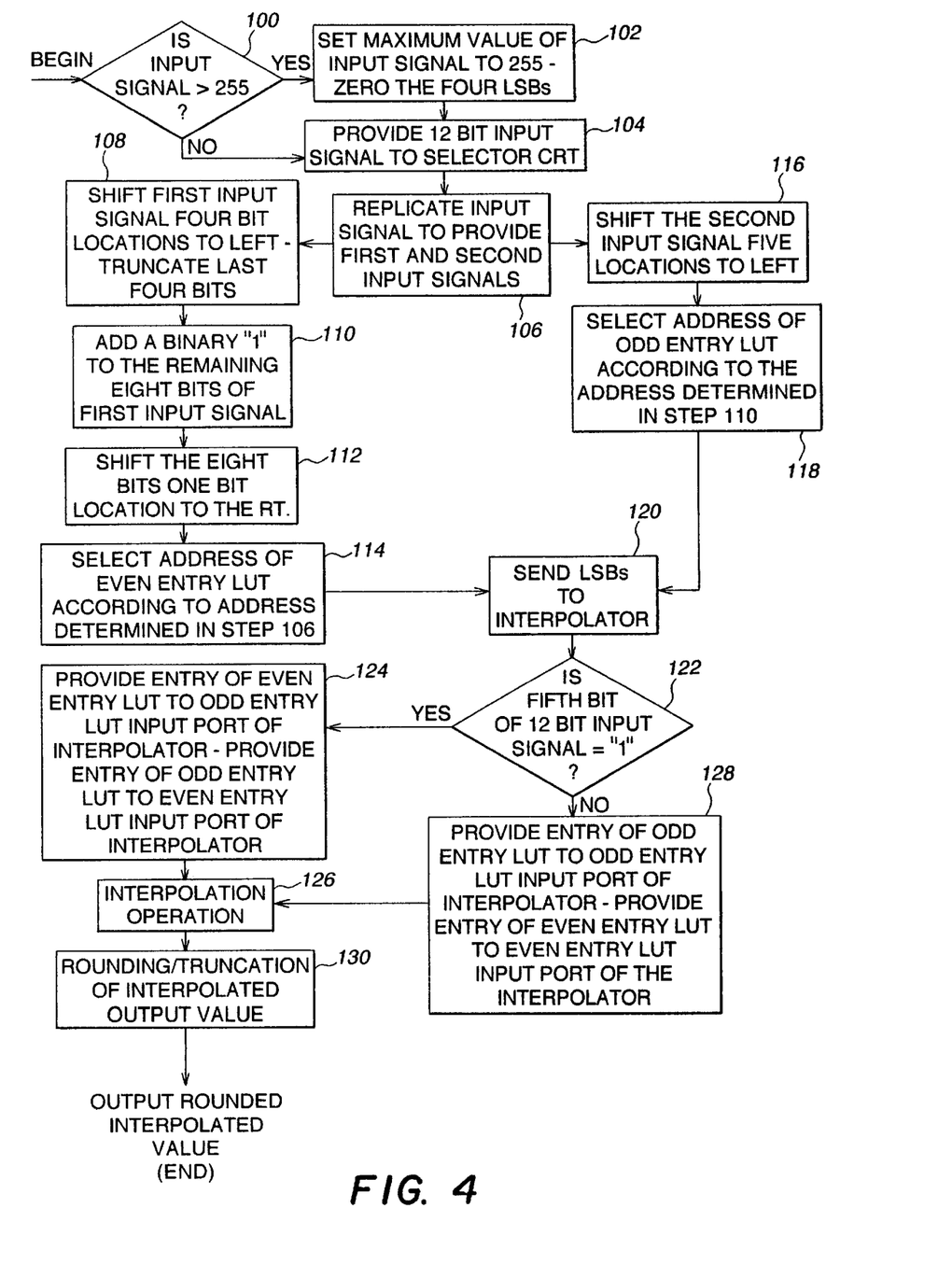
FIG. 4 is a flow chart of the operation of the selector circuit shown in FIGS. 3A and 3B.

Referring now to FIG. 4, a flow chart of the operation of the interpolated LUT circuit 20 is shown. In a preferred embodiment of the invention, an N-bit input signal (i.e., 12 bit) is provided by a video camera or the like. The input signal is analyzed to determine if its value is greater than 255 (Step 100). If the input signal value is greater than 255, (YES in Step 100) the LSBs are made all "0" (Step 102) and then provided to the selector circuit (Step 104). However, if the input signal value is less than 255, (NO in Step 100) then the entire input signal is directly provided to the selector circuit 24 (step 104). The selector circuit 24 performs two operations in parallel. Preferably, the input signal is replicated (i.e., copied) and each copy of the input signal is provided to odd and even sections (not shown in the drawings) of the selector circuit (step 106). In the even section of the selector circuit, the first copy of the input signal is shifted four bit locations to the left (i.e., the last, or least significant, four bits of the 12-bit input signal are truncated, or eliminated) (Step 108). Thereafter, a binary "1" is added to the remaining eight bits of the input signal (Step 110), the remaining eight bits are shifted one location to the right, and the most significant bit, which is empty due to the right shift, is "filled-in" with a zero (Step 112). Steps 108, 110 and 112 have the effect of adding one to the input signal and dividing by two so as to locate the correct entry in the EVEN entry LUT based on the input signal. Thereafter, the entry address of the EVEN entry LUT determined in Step 112 is selected (Step 114).

Concurrent to the occurrence of Steps 108–114, the odd section of the selector circuit 24 preferably shifts the second copy of the 12-bit input signal five locations to the left (Step 116). This operation has the effect of dividing the input signal by two and truncating the results. Thereafter, the address determined in Step 116 is utilized to select a specific entry of the ODD entry LUT 22b (Step 118). Then, the selector circuit 24 provides the least significant bits (i.e., the four LSBs of the original 12-bit input signal) to the interpolator (Step 120). In addition, the original 12-bit input signal is examined to determine whether the fifth bit (i.e., the fifth bit counted from the right-most bit) is equivalent to "1" (Step 122). This step determines whether the original 12-bit input signal is an odd or even number. If the fifth bit of the original input signal is equivalent to "1" (YES in Step 122), then the entry corresponding to the EVEN entry LUT memory address is provided to the ODD entry LUT input port of the interpolator 26, and the entry corresponding to the ODD entry LUT address is provided to the EVEN entry LUT input port of the interpolator 26 (Step 124). This switching is performed so that interpolation between the selected ODD and EVEN LUT entries occurs in the proper direction. Thereafter, the interpolator 26 performs an interpolation operation (Step 126) as explained in detail above.

If the fifth bit of the input signal is not equivalent to "1" (NO is Step 122), then the entry corresponding to the ODD entry LUT memory address and the entry corresponding to the EVEN entry LUT memory address are provided to the respective ODD and EVEN entry LUT input ports of the interpolator 26 (Step 128). Thereafter, the interpolator 26 performs the interpolation operation as explained in detail above (Step 126) and a rounding or truncation of the signal determined by the interpolation operation occurs (Step 130).

Referring now to Table 4 below, the function of the selection circuit 24 in determining which entry of the EVEN entry LUT and ODD entry LUT should be chosen is apparent. Specifically, the fractional portion of the N-bit input signal is irrelevant in selecting an entry. However, it is important to know whether the "whole" portion of the input signal (shown in decimal rather than binary numbers for simplicity) is even or odd. If the "whole" portion is even, then the operation of the selector circuit 24 for both the EVEN and ODD entry LUTs is relatively simple. Specifically, the "whole" portion of the input signal is divided by 2 (which may be accomplished efficiently as a shift right by 1 bit position, or equivalently by simply taking the 7 MSBs of the "whole"). If the "whole" portion of the input signal is odd, then a "1" must be added to the "whole" portion and then divided by 2. These steps were shown above in connection with FIG. 4.

It should be mentioned again that when the "whole" portion of the input signal is odd (e.g. 1.25 in Table 4), the interpolator circuit 26 would interpolate in the wrong direction and would obtain a wrong answer if the entries from the EVEN entry LUT and ODD entry LUT are provided to respective ODD and EVEN entry LUT input ports of the interpolator circuit. To obtain a correct output signal, the input signals (i.e., entries of the EVEN entry LUT and ODD entry LUT) provided to the interpolator 26 must be switched. Only then would the N and N+1 elements be properly entered in the linear interpolation equation to produce the correct result.

TABLE 4

| Input Value | N | N + 1 | Corresponding Even LUT Entry | Corresponding Odd LUT Entry |
| --- | --- | --- | --- | --- |
| 0.25 | 0 | 1 | 0 | 0 |
| 0.75 | 0 | 1 | 0 | 0 |
| 1.25 | 1 | 2 | 1 | 0 |
| 1.75 | 1 | 2 | 1 | 0 |
| 2.25 | 2 | 3 | 1 | 1 |
| 2.75 | 2 | 3 | 1 | 1 |
| 3.25 | 3 | 4 | 2 | 1 |
| 3.75 | 3 | 4 | 2 | 1 |
| 4.25 | 4 | 5 | 2 | 2 |
| 4.75 | 4 | 5 | 2 | 2 |
| 5.25 | 5 | 6 | 3 | 2 |
| 5.75 | 5 | 6 | 3 | 2 |
| ... | ... | ... | ... | ... |
| 253.25 | 253 | 254 | 127 | 126 |
| 253.75 | 253 | 254 | 127 | 126 |
| 254.25 | 254 | 255 | 127 | 127 |
| 254.75 | 254 | 255 | 127 | 127 |
| 255.25 | 255 | 255 | xxx | 127 |
| 255.75 | 255 | 255 | xxx | 127 |

Referring now to FIG. 3B of the drawings, an alternate embodiment of the present invention is shown. FIG. 3B is substantially similar to FIG. 3A except that selector circuit 24 of FIG. 3A has been replaced by first and second selector circuits 24a, 24b which, based upon the portion of the input signal received (e.g. MSBs), selects an entry from each of the EVEN and ODD entry LUTs that most closely approximates the value corresponding to the Q bits of the input signal. The first and second selector circuits 24a and 24b of FIG. 3B operate in a manner which is substantially similar to that shown in connection with FIG. 4. Of course, step 106 is not required because the signal produced by step 104 is utilized directly by selector circuits 24a, 24b.

It should be mentioned that more than two LUTs can be utilized to provide a larger interpolation kernel (i.e., a neighborhood of more than two entries about the input signal) for use by interpolator circuit 26. A suitable interpolator circuit 26 can be implemented using any programmable microprocessor, such as a Pentium Processor, manufactured by Intel Corporation of Santa Clara, Calif. wherein a particular interpolation method, such as the linear interpolation method described above, or the methods disclosed in chapter 3 of "Numerical Recipes in C, The Art of Scientific Programming", by William H. Press et al. published by Cambridge University Press (1992) (the entire disclosure of which is incorporated herein by reference) is employed. With the interpolation method performed by the interpolator circuit 26, a more precise representation of an M-bit LUT output signal based upon the Q bits of an N-bit input signal is provided. It should also be mentioned that the single-port LUT apparatus as described above has been found to be at least 50% faster and significantly smaller than utilization of the dual-port LUT while costing significantly less.

Although illustrative embodiments of the present invention have been described herein with reference to the accompanying drawings, it is understood that the invention is not limited to those precise embodiments. Various changes and modifications may be effected therein by one with ordinary skill in the art. For example, the number of entries of the LUT can be varied depending upon the desired number of MSBs of the input signal to be initially used. For example, the LUT can include any number of entries which are an exponent of two (e.g., number of entries equals $2^n$, where n is a whole number and equivalent to no more than the number of bits of the input signal). Typically, n will correspond to the number of MSBs of the input signal which are used to determine the particular entry of the LUT. It is foreseen that the Value and Delta portions of each LUT entry can have varying sizes. It is also foreseen that the function of the selection means can be directly incorporated into the functions of the LUT and that the functions of the adder and combiner can be incorporated into a single device, one example of which is disclosed in U.S. Pat. No. 5,148,381. It is also foreseen that higher order interpolation schemes could be utilized that may require the LUT to provide more than two pieces of information to the interpolator, and may require the interpolator to have more arithmetic operators, and that a LUT having a total number of entries which is not a power of 2 (i.e., total number of entries$\neq 2^N$) could be employed. It is also foreseen that instead of internally switching the ODD and EVEN LUT entries within the interpolator circuit when the fifth bit of the N-bit input signal is equivalent to "1", the weighting function of the ODD LUT which is dictated by the LSBs (N–Q Bits) can be applied to the EVEN LUT entry in the interpolator and the weighting function of the EVEN LUT which is dictated by the LSBs (N–Q Bits) can be applied to the ODD LUT entry in the interpolator. These and other changes of a similar nature are readily apparent to anyone with ordinary skill in the art and, as such, are intended to fall within the scope of the present invention as defined by the following claims.

What is claimed is:

1. An interpolated lookup table (LUT) circuit comprising:
    an input port for receiving an input signal having a first plurality of bits including a first portion and a second portion;
    a LUT having a plurality of entries, each of the plurality of entries having a second plurality of bits including a first portion and a second portion;
    a selector circuit operatively coupled to said input port, said selector circuit being responsive to at least said first portion of the input signal for selecting one of the plurality of entries of said LUT;
    a multiplier operatively coupled to said input port and said LUT, the multiplier combining the second portion of the input signal and the second portion of the selected LUT entry to provide a multiplier output signal; and
    an adder operatively coupled to the multiplier and said LUT, said adder combining the multiplier output signal and the first portion of the selected LUT entry to provide an interpolated LUT circuit output signal.

2. The interpolated LUT circuit as defined by claim 1, further comprising:
    a rounding circuit operatively coupled to said adder, said rounding circuit modifying the interpolated LUT circuit output signal to provide a rounded interpolated LUT circuit output signal.

3. The interpolated LUT circuit as defined by claim 1, wherein the second plurality of bits is at least equal to the first plurality of bits.

4. The interpolated LUT circuit as defined by claim 1, wherein the plurality of entries of the LUT is substantially equivalent to $2^Q$, where Q is equivalent to the number of bits of the first portion of the first plurality of bits.

5. The interpolated LUT circuit as defined by claim 1, wherein the first portion of the second plurality of bits of each of the plurality of entries of the LUT are computed as follows:

$F_c(X) = 4.5X$ when $0 \leq X < 0.018$ $F_c(X) = 1.099 X^{0.45} - 0.099$ when $0.018 \leq X \leq 1$.

6. The interpolated LUT circuit as defined by claim 5, wherein $0 \leq X > 1$ and wherein X is varied in substantially equal increments between 0 and 1.

7. The interpolated LUT as defined by claim 1, wherein the second portion of the second plurality of bits of a current (q) entry of the LUT is computed by subtracting the first portion of the second plurality of bits of the current (q) entry from the first portion of the second plurality of bits of a next (q+1) entry of the LUT.

8. The interpolated LUT as defined by claim 1, wherein the LUT is a single port device.

9. An interpolated lookup table (LUT) circuit comprising:
    an input port for receiving an input signal having a first plurality of bits including a first portion and a second portion;
    a LUT having a plurality of entries, each of the plurality of entries having a second plurality of bits including a first portion and a second portion;
    a selector circuit operatively coupled to said input port, said selector circuit being responsive to at least said first portion of said input signal for selecting one of the plurality of entries of the LUT; and
    a combiner circuit operatively coupled to the input port and the LUT, wherein the combiner circuit initially combines the second portion of the input signal with the second portion of the selected LUT entry to provide an adjustment signal, and then combines the adjustment signal with the first portion of the the selected LUT entry. of the second plurality of bits of the selected LUT circuit entry to provide an interpolated LUT output signal.

10. The interpolated LUT circuit as defined by claim 9 further comprising:
    a rounding circuit operatively coupled to said combiner circuit, said rounding circuit modifying the interpolated LUT circuit output signal to provide a rounded interpolated LUT circuit output signal.

11. The interpolated LUT circuit as defined by claim 9, wherein the second plurality of bits is at least equal to the first plurality of bits.

12. The interpolated LUT circuit as defined by claim 9, wherein the plurality of entries of the LUT is substantially equivalent to $2^Q$, where Q is equivalent to the number of bits of the first portion of the first plurality of bits.

13. The interpolated LUT circuit as defined by claim 9, wherein the first portion of the second plurality of bits of each of the plurality of entries of the LUT are computed as follows:

$F_c(X) = 4.5X$ when $0 \leq X < 0.018$ $F_c(X) = 1.099 X^{0.45} - 0.099$ when $0.018 \leq X \leq 1$.

14. The interpolated LUT circuit as defined by claim 13, wherein $0 \leq X \leq 1$ and wherein X is varied in substantially equal increments between 0 and 1.

15. The interpolated LUT circuit as defined by claim 9, wherein the second portion of the second plurality of bits of a current (q) entry of the LUT is computed by subtracting the first portion of the second plurality of bits of the current (q) entry from the first portion of the second plurality of bits of a next (q+1) entry of the LUT.

16. The interpolated LUT circuit as defined by claim 9, wherein the LUT is a single-port device.

17. The interpolated LUT circuit as defined by claim 9, wherein the combiner circuit multiplies the second portion of the input signal and the second portion of the second plurality of bits of the selected LUT entry to provide said adjustment signal, and adds the first portion of the second plurality of bits of the selected LUT entry to the adjustment signal.

18. An interpolated lookup table (LUT) circuit comprising:
an input port for receiving an input signal having a first plurality bits including a first portion and a second portion;
a LUT having a plurality of entries, each of said plurality of entries having a second plurality of bits including a first portion and a second portion, said LUT being responsive to at least the first portion of the input signal for selecting one of the plurality of entries of said LUT; and
a combiner circuit for initially combining the second portion of the input signal, with the second portion of the selected LUT entry to provide an adjustment signal, and then combines the adjustment signal with the first portion of the selected LUT entry.

19. The interpolated LUT circuit as defined by claim 18, further comprising:
a rounding circuit operatively coupled to said combiner circuit, said rounding circuit modifying the interpolated LUT circuit output signal to provide a rounded interpolated LUT circuit output signal.

20. The interpolated LUT circuit as defined by claim 18, wherein the second plurality of bits is at least equal to the first plurality of bits.

21. The interpolated LUT circuit as defined by claim 18, wherein the plurality of entries of the LUT is substantially equivalent to $2^Q$, where Q is equivalent to the number of bits of the first portion of the first plurality of bits.

22. The interpolated LUT circuit as defined by claim 18, wherein the first portion of the second plurality of bits of each of the plurality of entries of the LUT are computed as follows:

$$F_c(X)=4.5X \text{ when } 0 \leq X < 0.018$$

$$F_c(X)=1.099X^{0.45}-0.099 \text{ when } 0.018 \leq X \leq 1.$$

23. The interpolated LUT circuit as defined by claim 22, wherein $0 \leq X \leq 1$ and wherein X is varied in substantially equal increments between 0 and 1.

24. The interpolated LUT circuit as defined by claim 18, wherein the second portion of the second plurality of bits of a current (q) entry of the LUT is computed by subtracting the first portion of the second plurality of bits of the current (q) entry from the first portion of the second plurality of bits of a next (q+1) entry of the LUT.

25. The interpolated LUT circuit as defined by claim 18, wherein the LUT is a single-port device.

26. The interpolated LUT circuit as defined by claim 18, wherein the combiner circuit multiplies the second portion of the input signal and the second portion of the second plurality of bits of the selected LUT entry to provide said adjustment signal, and adds the first portion of the second plurality of bits of the selected LUT entry to the adjustment signal.

27. A method for determining an interpolated value of a lookup table (LUT) having a plurality of LUT entries in response to an input signal having a first plurality of bits including a first portion and a second portion, each of the plurality of LUT entries having a second plurality of bits including a first portion and a second portion, the method comprising the steps of:
a. selecting one of the plurality of LUT entries in response to the first portion of the input signal;
b. combining the second portion of the input signal and the second portion of the selected LUT entry to provide an adjustment signal; and
c. adding the adjustment signal to the first portion of the selected LUT entry to provide said interpolated value of the LUT.

28. The method for determining an interpolated value of a LUT as defined by claim 27 further comprising the step of:
rounding the interpolated value of the LUT.

29. An interpolated lookup table (LUT) circuit comprising:
an input port for receiving an input signal having a first plurality of bits including at least a first portion and a second portion;
first and second single-port LUTs having a respective first and second plurality of entries, each of the respective first and second plurality of entries of said first and second single-port LUTs having a second plurality of bits, each of said first and second single-port LUTs being responsive to at least the first portion of said input signal for selecting an entry from each of the respective first and second pluralities of entries;
an interpolator circuit operatively coupled to said first and second LUTs for producing an interpolated LUT output signal, said interpolator circuit performing an interpolation function utilizing at least the entries selected from each of the first and second single-port LUTs to produce an interpolated LUT circuit output signal;
wherein the first and second single-port LUTs store $2^Q$ entries where Q is equal to the first plurality of bits of the input signal, the first single-port LUT being an even entry LUT which stores $2^{(Q-1)}$ even numbered entries of the $2^Q$ entries, and the second single-port LUT is an odd entry LUT which stores $2^{(Q-1)}$ odd numbered entries of the $2^Q$ entries, and wherein any even numbered entry falls between two adjacent odd numbered entries and any odd numbered entry falls between two adjacent even numbered entries such that at least two consecutive entries of the $2^Q$ entries can be simultaneously accessed.

30. The interpolated LUT circuit as defined by claim 29 wherein said entries from each of the first and second single-port LUTs are first and second entries, respectively, and further comprising:
a first selector circuit operatively coupled to said input port, said first selector circuit being responsive to at least the first portion of said input signal for selecting at least said first and second entries of said first and second LUTs.

31. The interpolated LUT circuit as defined by claim 29 wherein said entries from each of the first and second single-port LUTs are first and second entries, respectively, and further comprising:
first and second selector circuits operatively coupled to said input port, said first and second selector circuits being responsive to at least the first portion of said input signal for selecting at least said first and second entries of said first and second LUTs.

32. The interpolated LUT circuit as defined by claim 29 wherein said interpolator circuit is operatively coupled to said input port for receiving the second portion of the first plurality of bits, said interpolator circuit utilizing the second portion of the first plurality of bits to provide the interpolated LUT circuit output signal.

33. The interpolated LUT circuit as defined by claim 29, further comprising:

a rounding circuit operatively coupled to said interpolator circuit, said rounding circuit modifying the interpolated LUT output signal to provide a rounded interpolated LUT circuit output signal.

34. The interpolated LUT circuit as defined by claim 29, wherein the second plurality of bits is at least equal to the first plurality of bits.

35. The interpolated LUT circuit as defined by claim 29, wherein the plurality of entries of each LUT is substantially equivalent to $2^Q$, where Q is equivalent to the number of bits of the first portion of the first plurality of bits.

36. The interpolated LUT circuit as defined by claim 29, wherein the first portion of the second plurality of bits of each of the plurality of entries of the first and second LUTs are computed as follows:

$$F_c(X)=4.5X \text{ when } 0 \leq X < 0.018$$

$$F_c(X)=1.099X^{0.45}-0.099 \text{ when } 0.018 \leq X \leq 1.$$

37. The interpolated LUT circuit as defined by claim 40, wherein $0 \leq X \leq 1$ and wherein X is varied in substantially equal increments between 0 and 1.

38. The interpolated LUT circuit as defined by claim 29, wherein each of the first and second LUTs is a single port device.

* * * * *

UNITED STATES PATENT AND TRADEMARK OFFICE
CERTIFICATE OF CORRECTION

PATENT NO.    : 5,951,625
DATED         : September 14, 1999
INVENTOR(S)   : Victor Duvanenko et al.

It is certified that error appears in the above-identified patent and that said Letters Patent is hereby corrected as shown below:

Item [56] References Cited under, "U.S. PATENT DOCUMENTS",
insert --

| | | |
|---|---|---|
| 4,941,039 | 7/1990 | E'Errico |
| 5,148,381 | 9/1992 | Sprague |
| 5,175,621 | 12/1992 | Maesato |
| 5,196,924 | 3/1993 | Lumelsky et al. |
| 5,243,426 | 9/1993 | Murayama et al. |
| 5,408,267 | 4/1995 | Main |
| 5,473,372 | 12/1995 | Nobuoka et al. |
| 5,568,596 | 10/1996 | Cawley |

OTHER PUBLICATIONS

Press et al, "Numerical Recipes in C", Chapter 3, pps. 105-128, Cambridge University Press, Second edition (1992).

UNITED STATES PATENT AND TRADEMARK OFFICE
CERTIFICATE OF CORRECTION

PATENT NO. : 5,951,625
DATED : September 14, 1999
INVENTOR(S) : Victor Duvanenko et al.

It is certified that error appears in the above-identified patent and that said Letters Patent is hereby corrected as shown below:

Foley et al, "Computer Graphics", pps. 166-170; 564-567; 860-861, ADDISSON-WESLEY PUBLISHING COMPANY (1990).

Brooktree, "Bt473 80 MHz Monolithic CMOS Triple 8-bit True-Color RAMDAC™ pps. 4-46 - 4-49, Graphics & Imaging, PRODUCT DATABOOK (1993).

Adobe, Photoshop 4.0 Manual, "Making Color and Tonal Adjustments", December, 1996 pps. 124-129. -- .

Signed and Sealed this

Fourth Day of September, 2001

*Attest:*

NICHOLAS P. GODICI
*Attesting Officer*     *Acting Director of the United States Patent and Trademark Office*